March 9, 1965  P. M. LOWY  3,172,208
DIAMETER GAUGES
Filed June 6, 1962
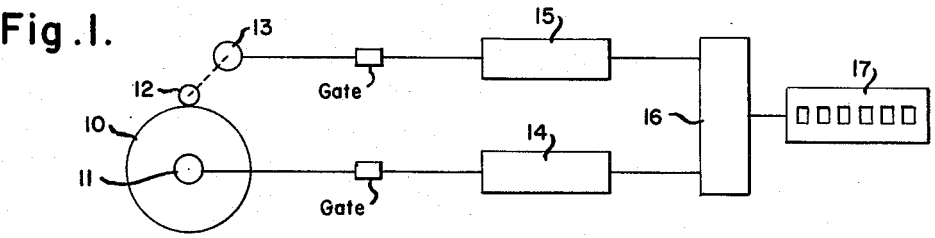
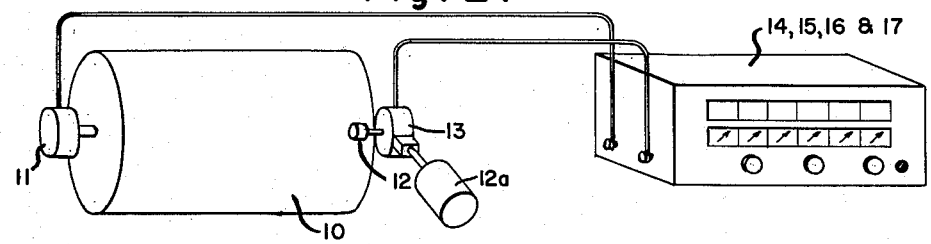
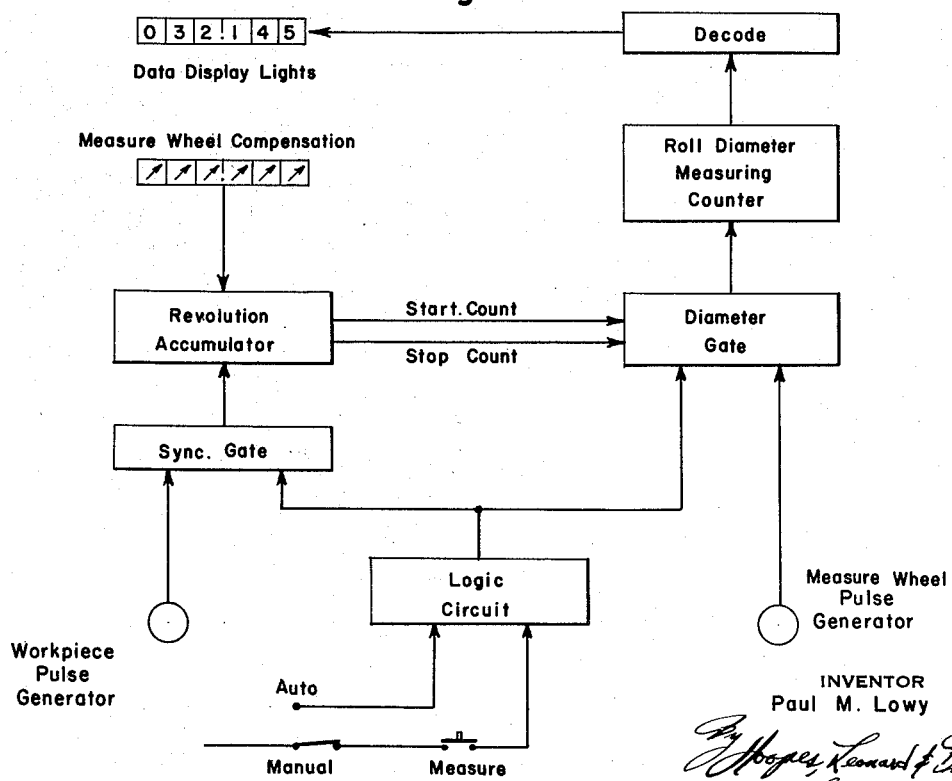
INVENTOR
Paul M. Lowy

United States Patent Office 3,172,208
Patented Mar. 9, 1965

3,172,208
DIAMETER GAUGES
Paul M. Lowy, Pittsburgh, Pa., assignor to Mesta
Machine Co., a corporation of Pennsylvania
Filed June 6, 1962, Ser. No. 200,402
4 Claims. (Cl. 33—142)

This invention relates to diameter gauges and particularly to a diameter measuring gauge and system by means of which a direct electrical readout of the internal or external diameter of a round piece, such as a shaft or roll, may be achieved while the piece is being turned in a lathe or otherwise being treated. One of the very real problems which has faced the machine tool art is that of rapidly determining the diameter of a round or cylindrical member which is being turned in a lathe for removal of a portion of the surface. In the past, it has been necessary to determine diameter by the use of calipers, fixed probes or similar devices. These devices are slow and usually require stopping of the workpiece in order to make an accurate measurement. This practice results in considerable loss of time and does not provide a constant diameter check on the piece being worked.

I have invented a diameter gauge which is capable of making continuous diameter measurements while the roll or cylindrical workpiece is being worked on without the need for stopping or reducing the speed of the workpiece. The diameter gauge of my invention is independent of speed of rotation and is unaffected by variations in speed of the workpiece.

I provide a measuring wheel of known diameter adapted to bear against the surface whose diameter is to be measured, a pulse generator actuated by said measuring wheel generating a pulse signal proportional to the rotation of the measuring wheel, a second pulse generator acting on the axis of the workpiece generating a pulse signal proportional to revolutions of the workpiece, a digital calculator receiving the pulses generated from the measuring wheel and the workpiece and a readout mechanism adapted to show the measured diameter in the required units.

In the foregoing general description, I have set out certain purposes, advantages and objects of this invention. Other objects, purposes and advantages will be apparent from the following description and the accompanying drawings in which FIGURE 1 is a schematic drawing of an apparatus according to my invention;

FIGURE 2 is a diagrammatic showing of a counting apparatus and diameter gauge according to my invention; and FIGURE 3 is a schematic illustration of the wiring elements of an apparatus according to my invention.

Referring to the drawings, I have illustrated a roll 10 of unknown diameter, a pulse generator 11 measuring the revolutions of the roll 10 and producing a pulse output proportional to the revolution. A measuring wheel 12 of known diameter is urged against the outer periphery of the roll 10 by means of a pneumatic cylinder 12a. The shaft of the measuring wheel 12 is connected to a pulse generator 13 which generates pulses proportional to the rotation of the measuring wheel. The pulse generator 11 and the pulse generator 13 are connected to counters 14 and 15, respectively, of conventional design. The counters 14 and 15 deliver their output to a digital calculator 16 which in turn relates the pulses coming through the counters 14 and 15 to produce a final readout diameter on the readout screen 17.

The measuring wheel is preferably of sufficient diameter that the pulse rate is not too high and yet small enough to produce an accurate measure without excess number of revolutions. A five-inch wheel has been found to be satisfactory. The pulse generator is preferably adapted to produce a thousand pulses per revolution of the measuring wheel. The pulse generator 11 on the spindle is preferably adapted to likewise produce a thousand pulses per revolution of the generator. The calculator 16 may be of the 8860 type, manufactured by Square D Company. The counters may be Hewlett-Packard Model 5512A or the like.

With the unknown diameter roll 10 rotating at constant speed to drive the measuring roll, the respective counters receiving the pulses from pulse generators 11 and 13 will show the number of revolutions each of the measuring wheel and the spindle makes in a given interval of time or number of revolutions of the unknown workpiece in the given time interval. The calculator gives a direct readout of the diameter by relating the rotations of the known diameter measuring wheel to the rotations of the spindle carrying the workpiece. For example, the circumference of a circle is:

Circumference $= \pi D$, where D is the diameter of the circle.

If a known diameter measuring wheel is rolled along a surface, each time it makes one revolution, it will have moved a distance equal to its circumference. If accurate start and stop points are provided, it is possible to measure the distance moved by the wheel. This can be done by counting the number of complete and partial revolutions made by the wheel when it moves between the start and stop points. Roll diameters can be measured in this manner if the total distance moved is divided by $\pi$.

A pulse generator coupled to the spindle revolving the unknown diameter work provides accurate start-stop signals. These start-stop signals are used to gate a counter which totals the number of complete and partial revolutions made by a calibrated measuring wheel rolling on the work surface.

For example, a one-inch diameter measuring wheel is directly coupled to a 1,000 pulse per revolution pulse generator. $\pi(1)$ inches of surface passing the measuring wheel causes it to revolve once. Suppose the measuring wheel is placed in contact with a roll of unknown diameter. If it revolves 15 times while the unknown roll revolves once, the diameter of the unknown roll is:

Circumference of unknown roll $= \pi D = \pi(1)15$.

Cancelling terms:

Unknown diameter $= 1 \times 15$ or 15 inches.

The output of the pulse generator is counted by the diameter counter. When the measuring wheel revolves 15 times, 15,000 pulses would be counted, providing diameter indication accurate to one thousandths of an inch.

By using this device, an operator can finish an inner or outer circumference to exact size, finish rolls in matching pairs, compensate for tool or grinding wheel wear, automatically align the piece for finished grinding or cutting and the like.

It is obvious that the measuring wheel can be used on the outer periphery of a circular object or it can be used internally of a hollow cylinder to measure the internal diameter of the cylinder.

The output from the calculator can be delivered directly to a control system for controlling the feed on the grinding wheel or tool which is working on the workpiece so as to automatically maintain the constant cut and constant diameter on the workpiece.

In the foregoing specification, I have described certain preferred embodiments of my invention. It will be obvious, however, that this invention may be otherwise embodied within the scope of the following claims.

I claim:

1. A diameter gauge comprising a measuring wheel of known diameter, means urging said wheel against the surface of a workpiece whose diameter is to be determined, pulse generator means generating a plurality of pulses on each revolution of the measuring wheel, counter means responsive to the pulses produced by said pulse generator, a second pulse generator means generating a plurality of pulses on each revolution of the workpiece, second counter means responsive to the pulses produced by said second pulse generator and means receiving an impulse from each of said counters and adapted to carry out the mathematical equation $$D = d \times \frac{P_m}{P_{m/rev}} \times \frac{P_{w/rev}}{P_w}$$

where D is diameter of the workpiece, small $d$ is diameter of the measuring wheel, $P_m$ is the number of pulses counted by the first pulse generator and $P_w$ is the number of pulses counted by the second pulse generator whereby and relating the proportional rotations of the measuring wheel and workpiece to derive a diameter of the workpiece.

2. A diameter gauge as claimed in claim 1 wherein the means for carrying out the mathematical computation is a digital computer.

3. A diameter gauge as claimed in claim 1 wherein the measuring wheel is urged against the workpiece by a constant pressure means.

4. A diameter gauge as claimed in claim 3 wherein the constant pressure means is an air cylinder.

References Cited by the Examiner

UNITED STATES PATENTS 2,582,682   1/52   Crookston _____ 33—129

FOREIGN PATENTS 1,108,043   5/61   Germany.

ISAAC LISANN, *Primary Examiner.*

LOUIS R. PRINCE, ROBERT B. HULL, *Examiners.*